United States Patent
Choi et al.

(10) Patent No.: US 9,290,179 B2
(45) Date of Patent: Mar. 22, 2016

(54) METHOD AND APPARATUS OF PREDICTING COLLISION FOR OMNIDIRECTIONAL APPLICATION WITHIN EMERGENCY BRAKE SYSTEM

(71) Applicant: Hyundai Motor Company, Seoul (KR)

(72) Inventors: Jae Woong Choi, Seoul (KR); Kwang Jin Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/553,102

(22) Filed: Nov. 25, 2014

(65) Prior Publication Data

US 2016/0052515 A1 Feb. 25, 2016

(30) Foreign Application Priority Data

Aug. 21, 2014 (KR) .................. 10-2014-0109124

(51) Int. Cl.
*B60W 40/114* (2012.01)
*B60W 30/095* (2012.01)
*B60W 40/105* (2012.01)

(52) U.S. Cl.
CPC ......... *B60W 30/0953* (2013.01); *B60W 40/105* (2013.01); *B60W 40/114* (2013.01)

(58) Field of Classification Search
CPC .......... B60W 30/0953; B60W 40/114; B60W 40/105

See application file for complete search history.

(56) References Cited

U.S. PATENT DOCUMENTS

| 8,751,142 | B2 | 6/2014 | Kim | |
|---|---|---|---|---|
| 2007/0016372 | A1* | 1/2007 | Browne | ................. G01C 21/32 701/469 |
| 2007/0282532 | A1* | 12/2007 | Yamamoto | .......... B60R 21/0134 701/301 |
| 2010/0214155 | A1 | 8/2010 | Harada | |

FOREIGN PATENT DOCUMENTS

| JP | 2010-195177 A | 9/2010 |
|---|---|---|
| JP | 2010-244290 A | 10/2010 |
| JP | 2011-204124 A | 10/2011 |
| KR | 10-2000-0027592 | 5/2000 |
| KR | 10-0946526 | 3/2010 |
| KR | 10-2011-0037441 A | 4/2011 |
| KR | 10-1029096 B1 | 4/2011 |

* cited by examiner

*Primary Examiner* — Mussa A Shaawat
*Assistant Examiner* — Yuen Wong
(74) *Attorney, Agent, or Firm* — Mintz Levin Cohn Ferris Glovsky and Popeo, P.C.; Peter F. Corless

(57) ABSTRACT

A method and an apparatus for predicting a collision are provided. The method includes calculating, by a controller, a driving trajectory of the subject vehicle based on a yaw rate using driving information of the subject vehicle. In addition, the controller is configured to calculate a driving trajectory of a target vehicle for a predetermined period of time that uses driving information of the target vehicle that includes information from an imaging device, configured to obtain a front image, and radar sensors installed on a plurality of locations. Further, the method also includes predicting classified collision types by analyzing a collision possibility between the subject vehicle and the target vehicle based on the driving trajectory of the subject vehicle and the driving trajectory of the target vehicle.

14 Claims, 9 Drawing Sheets

| Cases | ORDER IN WHICH TTX IS INCREASED | | | | | | | | | Collision |
|---|---|---|---|---|---|---|---|---|---|---|
| | | TTI | | TTId | | TTEa | | TTE | | |
| (1) | TTAI/TTAE | | | | | | | | | Avoided |
| (2) | | TTAI | TTAE | | | | | | | Avoidable |
| (3) | | TTAI | | TTAE | | | | | | Collision |
| (4) | | TTAI | | | | TTAE | | | | Collision |
| (5) | | TTAI | | | | | | TTAE | | Collision |
| (6) | | TTAI/TTAE | | | | | | | | Avoidable |
| (7) | | | TTAI | TTAE | | | | | | Collision |
| (8) | | | TTAI | | | TTAE | | | | Collision |
| (9) | | | TTAI | | | | | TTAE | | Collision |
| (10) | | | | TTAI/TTAE | | | | | | Collision |
| (11) | | | | | TTAI | TTAE | | | | Collision |
| (12) | | | | | TTAI | | | TTAE | | Collision |
| (13) | | | | | | TTAI/TTAE | | | | Avoidable |
| (14) | | | | | | | TTAI | TTAE | | Avoidable |
| (15) | | | | | | | | TTAI/TTAE | | Avoided |

FIG 6

| Flag Collision | |
|---|---|
| 0 | NO TARGET |
| 1 | TARGET LOST |
| 2 | TARGET ON ONLY |
| 3 | TARGET ON & TTX IS OBSERVED |
| 4 | NOT CONFIRMED YET |
| 5 | COLLISION AVOIDANCE IS CONFIRMED |
| 6 | NOT CONFIRMED YET |
| 7 | COLLISION IS CONFIRMED |
| 8 | COLLISION IMMINENT |

FIG 7

| | COLLISION TYPE |
|---|---|
| 0 | NON-COLLISION |
| 1 | REAR-ENDING (COLLIDED BY SUBJECT VEHICLE) |
| 2 | CROSSING COLLISION (FRONT-SIDE/REAR) |
| 3 | CROSSING COLLISION (FRONT-FRONT) |
| 4 | ONCOMING VEHICLE (FRONT-FRONT) |
| 5 | CROSSING COLLISION (SIDE/REAR-FRONT) |
| 6 | REAR-ENDING (COLLIDED BY THE OTHER VEHICLE) |
| 7 | NON-CLASSIFICATION |

FIG 9

METHOD AND APPARATUS OF PREDICTING COLLISION FOR OMNIDIRECTIONAL APPLICATION WITHIN EMERGENCY BRAKE SYSTEM

CROSS-REFERENCE TO RELATED APPLICATION

This application is based on and claims the benefit of priority to Korean Patent Application No. 10-2014-0109124, filed on Aug. 21, 2014, the disclosure of which is incorporated herein in its entirety by reference.

TECHNICAL FIELD

The present disclosure relates to a method and an apparatus for predicting a collision between vehicles, and more particularly, to a method and an apparatus for predicting a collision capable of expanding collision objects to a crossing vehicle, an oncoming vehicle, and a rear-ending vehicle in addition to a front vehicle within an emergency brake system.

BACKGROUND

An emergency brake system such as an advanced emergency brake (AEB) system performs functions such as predicting a collision emergency of a front vehicle (e.g., a vehicle in front of a traveling vehicle), providing a warning, assisting in applying vehicle brakes, and performing an emergency automatic brake. When a subject vehicle continuously drives at a current velocity ($v_{rel}$), a time-to-collision (TTC) may be calculated using Equation 1 below to predict a collision with the front vehicle based on a distance between the subject vehicle and the front vehicle (c). Warning times related to an emergency brake, the assisting of the braking by the driver, and the like may be determined based on the TTC.

$$TTC = \frac{c}{v_{rel}} \quad \text{Equation 1}$$

The above-mentioned emergency brake system is based on monitoring vehicles that surround the subject vehicle using front, side, and rear radars of the vehicle and a stereo imaging device may be limited in certain situations.

An emergency brake system according to related art may not determine risk of collision with a crossing vehicle (e.g., a vehicle moving in a direction substantially across the subject vehicle), an oncoming vehicle (e.g., a vehicle moving towards the subject vehicle), a rear-ending vehicle (e.g., a vehicle traveling behind the subject vehicle), and the like.

SUMMARY

An aspect of the present disclosure provides a method and an apparatus for predicting a collision emergency that may be configured to calculate a predefined time-to-intersect and time-to-exit related information (e.g., time-to-Intersect (TTI), time-to-exit (TTE), time-to-angular-intersect (TTAI), time-to-angular-exit (TTAE), time-to-collision (TTC), and the like) and determine various collision types based on a corresponding collision flag that uses a driving trajectory of another (e.g., target) vehicle and a driving trajectory of a subject vehicle to avoid a collision that expands collision vehicles to a crossing vehicle, an oncoming vehicle, and a rear-ending vehicle as well as a front vehicle within an emergency brake system such as an advanced emergency brake (AEB) system.

According to an aspect of the present disclosure, a method for predicting a collision emergency for the target vehicle by a subject vehicle may include: calculating, by a controller, a driving trajectory of the subject vehicle based on a yaw rate that uses driving information of the subject vehicle; calculating, by the controller, a driving trajectory of a target vehicle for a predetermined time that uses driving information of the target vehicle. The driving information of the vehicle may include information from an imaging device (e.g., camera, video camera and the like) configured to obtain a front image and radar sensors disposed at a plurality of locations; and predicting collision types by analyzing a collision possibility between the subject vehicle and the target vehicle based on the driving trajectory of the subject vehicle and the driving trajectory of the target vehicle. The method may also include predicting, by the controller, the collision with a vehicle in an omni-direction (e.g., about 360 degrees around the subject vehicle) that may include a left side, a right side, and a rear side in addition to a front side of the subject vehicle. The target vehicle may include at least one selected from the group consisting of: a front vehicle (e.g. a target vehicle in front of the subject vehicle), a crossing vehicle (e.g., a target vehicle travelling in a direction substantially across the subject vehicle), an oncoming vehicle (e.g., a target vehicle moving towards the subject vehicle), and a rear vehicle (e.g., a target vehicle behind the subject vehicle).

The calculation of the driving trajectory of the target vehicle may include calculating locations of the target vehicle during a predetermined period of time based on a velocity, an acceleration, and a yaw rate of the target vehicle, which may be estimated by analyzing the driving information of the target vehicle. The predicting of the collision types may include: calculating tracking information (TTX), which may be related to a time the target vehicle intersects with or exits from the driving trajectory of the subject vehicle, during the predetermined period of time; and determining at least one of a plurality of collision types for the target vehicle by predicting collision flags, which may be classified in advance based on conditions that use the TTX.

The TTX may include at least one of selected from the group consisting of: a time when the target vehicle intersects with the driving trajectory of the subject vehicle (TTI), a time when the entire target vehicle exits from the driving trajectory of the subject vehicle (TTE), a time when a portion of the target vehicle angularly-intersects (e.g., when the target vehicle does not travel parallel to or side by side with the subject vehicle) with a path of a circular trajectory of the subject vehicle based on a center point of a curvature radius of the driving trajectory of the subject vehicle (TTAI), a time when a target vehicle angularly-exits from the path of the circular trajectory of the subject vehicle based on the center point of the curvature radius of the driving trajectory of the subject vehicle (TTAE), a time when the portion of the target vehicle intersects with the path of the driving trajectory of the subject vehicle (TTI$_d$), or a time when the target vehicle exits from the path of the driving trajectory of the subject vehicle (TTE$_d$). The TTI$_d$ may be calculated based on the TTI when the subject vehicle decelerates and set to a predetermined maximum value when the deceleration of the subject vehicle is greater than a predetermined value. The TTE$_a$ may be calculated using the TTE when the subject vehicle accelerates and set to a predetermined maximum value when the acceleration of the subject vehicle is less than a predetermined value.

Within the determination of any one of the plurality of collision types, the collision types that may be determined may include when the collision is possible within a predetermined time based on a time difference between the TTI and the TTAE. Further, a time difference between the TTAI and the TTE may be determined using a time to collision (TTC), which may be when the collision with the target vehicle is expected. The TTC may be calculated using at least one selected from the group consisting of: the TTI, the TTE, the TTAI, or the TTAE, the driving information of the subject vehicle, a collision direction at the TTC, or the driving trajectory of the target vehicle.

The plurality of collision types may include a non-collision, a first rear collision (e.g., the target vehicle is in front of the subject vehicle), a collision between a front of the subject vehicle and a side rear of a target vehicle, a collision between the front of the subject vehicle and a front of the target vehicle, a collision between the front of the subject vehicle and a front of an oncoming target vehicle, a collision between a side rear of the subject vehicle and the front of the target vehicle, or a second rear collision (e.g., when the subject vehicle in front of the target vehicle).

According to another aspect of the present disclosure, an apparatus for predicting a collision with a target vehicle by a subject vehicle may include: a subject vehicle path predicting unit configured to calculate a driving trajectory of the subject vehicle based on a yaw rate that uses driving information of the subject vehicle; and a situation awareness unit configured to calculate a driving trajectory of a target vehicle for a predetermined period of time that uses driving information of the target vehicle that includes information from an imaging device configured to obtain a front image and radar sensors installed on a plurality of locations and configured to predict classified collision types by analyzing a collision probability between the subject vehicle and the target vehicle based on the driving trajectory of the subject vehicle and the driving trajectory of the target vehicle. A controller may be configured to execute the subject vehicle path predicting unit and the situation awareness unit. The apparatus may be configured to predict a collision in all directions (e.g., omni-directional), which may include a left side, a right side, and a rear side in addition to a front side of the subject vehicle. The target vehicle may include a front vehicle (e.g., a vehicle traveling in front of the subject vehicle), a crossing vehicle (e.g., a vehicle traveling in a direction substantially across the subject vehicle), an oncoming vehicle (e.g., a vehicle traveling towards the subject vehicle), or a rear vehicle (e.g., a vehicle traveling behind the subject vehicle).

The situation awareness unit may include a target path predicting unit configured to calculate locations of the target vehicle during a predetermined period of time based on a velocity, an acceleration, and a yaw rate of the target vehicle which may be estimated by analyzing the driving information of the target vehicle. Further, the situation awareness unit may include: a tracking information calculating unit configured to calculate tracking information (TTX), which may be related to a time when the target vehicle intersects with or exits from the driving trajectory of the subject vehicle, during the predetermined period of time; and a collision determining unit configured to determine any one of a plurality of collision types for the target vehicle using predicted collision flags, which may be classified in advance based on conditions using the TTX.

The TTX may include at least one selected from the group consisting of: a time when a portion of the target vehicle intersects with a path of the driving trajectory of the subject vehicle (TTI), a time when the entire target vehicle exits from the path of the driving trajectory of the subject vehicle (TTE), a time when the portion of the target vehicle angularly-intersects with a path of a circular trajectory of the subject vehicle based on a substantially center point of a curvature radius of the driving trajectory of the subject vehicle (TTAI), a time when an entire target vehicle angularly-exits from the path of the circular trajectory of the subject vehicle based on the center point of the curvature radius of the driving trajectory of the subject vehicle (TTAE), a time when the portion of the target vehicle intersects with the path of the driving trajectory of the subject vehicle ($TTI_d$), or a time when the entire target vehicle exits from the path of the driving trajectory of the subject vehicle ($TTE_d$). The $TTI_d$ may be calculated based on the TI when the subject vehicle decelerates and set to a predetermined maximum value when the deceleration of the subject vehicle is greater than a predetermined value. The $TTE_a$ may be calculated based on the TTE when the subject vehicle accelerates and set to a predetermined maximum value when the acceleration of the subject vehicle is less than a predetermined value.

The collision determining unit may be configured to determine the collision types for collision flags that correspond to when collision may be possible within a predetermined period of time based on a time difference between the TTI and the TTAE and a time difference between the TTAI and the TTE by referencing a time to collision (TTC), at which the collision with the target vehicle is expected and may be calculated using the TTI, the TTE, the TTAI, or the TTAE, the driving information of the subject vehicle, a collision direction at the TTC, or the driving trajectory of the target vehicle.

The plurality of collision types may include at least one selected from the group consisting of: a non-collision, a first rear collision (e.g., when the target vehicle is in front of the subject vehicle), a collision between a front of the subject vehicle and a side rear of a crossing vehicle, which may be the target vehicle, a collision between the front of the subject vehicle and a front of a crossing vehicle, which may be the target vehicle, a collision between the front of the subject vehicle and a front of an oncoming vehicle, which may be the target vehicle, a collision between a side rear of the subject vehicle and the front of the crossing vehicle which may be the target vehicle, or a rear collision when the subject vehicle is in front of the target vehicle.

BRIEF DESCRIPTION OF THE DRAWINGS

The above and other objects, features and advantages of the present disclosure will be more apparent from the following detailed description taken in conjunction with the accompanying drawings.

FIG. 6 is an exemplary conditional table for predicting whether or not a collision between the subject vehicle and the target vehicle occurs based on time-to-intersect and time-to-exit related tracking information (TTX) according to an exemplary embodiment of the present disclosure;

FIG. 7 is an exemplary table of collision flags according to an exemplary embodiment of the present disclosure;

FIG. 9 is an exemplary table of collision types according to an exemplary embodiment of the present disclosure.

DETAILED DESCRIPTION

Figure 1:
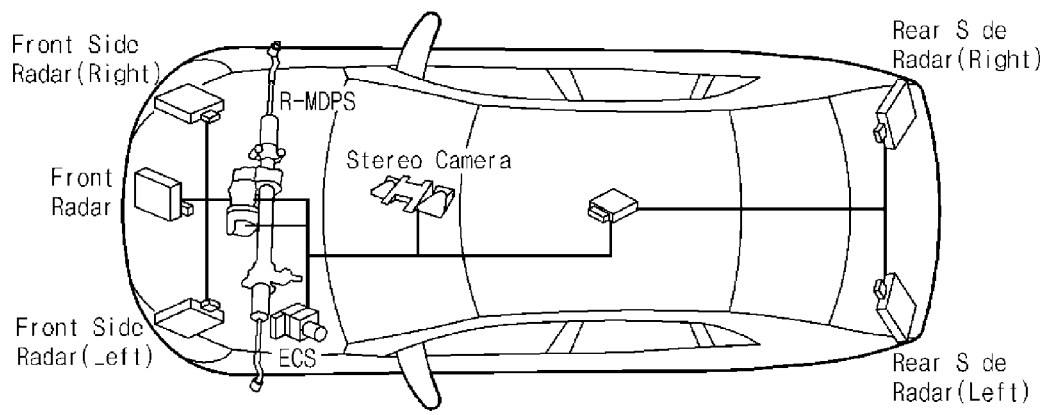
FIG. 1 is an exemplary diagram showing a configuration in which an imaging device, a radar sensor, and the like of predicting a collision emergency are mounted within a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described in detail with reference to the accompanying drawings. Here, like reference numerals denote like elements in the respective drawings. In addition, a detailed description of functions and/or configurations which are already known will be omitted. The contents disclosed below mainly describe portions necessary to understand operations according to various exemplary embodiments and a description of elements which may obscure the gist of the description will be omitted. In addition, some components shown in the drawings may be exaggerated, omitted or schematically illustrated. The size of each component does not exactly reflect its real size and accordingly, the contents described in this specification are not limited by relative sizes or intervals of the components illustrated in the respective drawings.

FIG. 1 is an exemplary diagram showing a configuration in which an imaging device, a radar sensor, and the like for predicting a collision emergency are mounted within a vehicle, according to an exemplary embodiment of the present disclosure. Since the present disclosure is based on a monitoring vehicles (e.g., front vehicle, crossing vehicle, oncoming vehicle, rear vehicle, and the like) in an omni-direction (e.g., about 360 degree) around a subject vehicle, the subject vehicle may be mounted with an imaging device (e.g., stereo camera, video camera, and the like) and a plurality of radar sensors configured to obtain a front image as illustrated in FIG. 1. The plurality of radar sensors may include a front central radar sensor, a front left radar sensor, a front right radar sensor, a rear left sensor, and a rear right sensor, and the like. In addition, the subject vehicle may be mounted with an anti-lock brake system (ABS), an electronic stability control (ESC) unit configured to stably maintain a vehicle position in an emergency situation that uses an engine torque control, a rack assist motor driven power steering (R-MDPS) system, an engine control unit (ECU) configured to generally operate the systems within the subject vehicle, and the like.

As described below, a variety of sensor information, image information obtained by the imaging device, which may be necessary to predict a driving trajectory of a target vehicle or a driving trajectory of the subject vehicle within the apparatus 100 for predicting the collision emergency, may be provided via a corresponding sensor or a controller area network (CAN) bus. Particularly, driving information of the target vehicle may be obtained using an imaging device image and the radar sensor, and the like and may be provided via the corresponding sensor or the CAN bus. In addition, information obtained via a velocity sensor, an acceleration sensor, and a yaw rate sensor, and the like may be provided via the corresponding sensor or the CAN bus.

Figure 2:
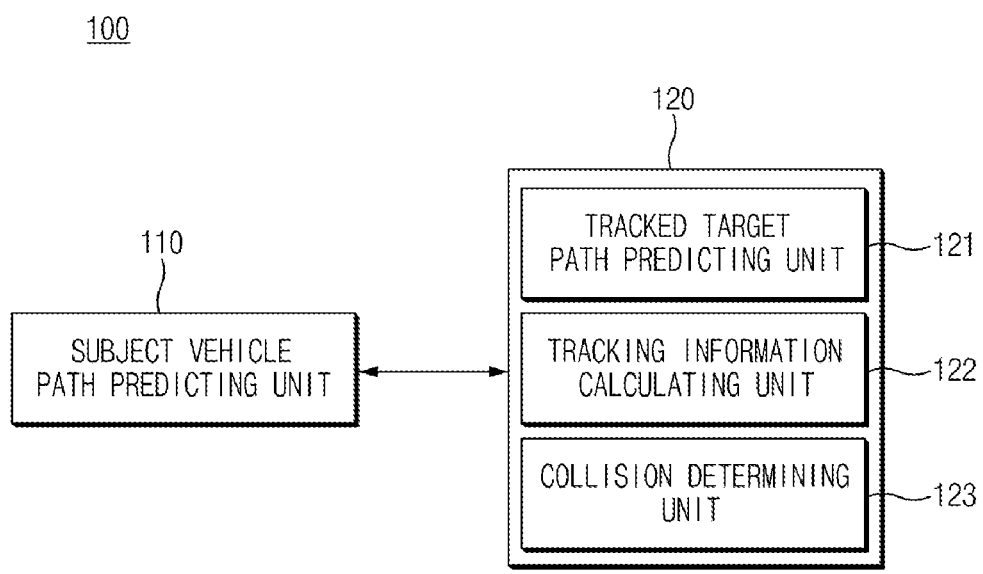
FIG. 2 is an exemplary block diagram of an apparatus for predicting a collision emergency according to an exemplary embodiment of the present disclosure.

FIG. 2 is an exemplary block diagram of the apparatus 100 for predicting the collision emergency according to the exemplary embodiment of the present disclosure. Referring to FIG. 2, the apparatus 100 may include a subject vehicle path predicting unit 110 and a situation awareness unit 120. The situation awareness unit 120 may include a target path predicting unit 121, a tracking information (TTX) calculating unit 122, and a collision determining unit 123. Components of the respective units of the apparatus 100 for predicting the collision may be implemented in hardware, software, or a combination thereof, and may be, for example, implemented in a semiconductor processor form, wherein any one of the components of the respective units may be implemented so as to include all or a portion of other components.

The subject vehicle path predicting unit 110 may be executed by a controller to predict a driving trajectory using driving information of the subject vehicle including information (e.g., velocity, acceleration, yaw rate, and the like) obtained by a velocity sensor, an acceleration sensor, and a yaw rate sensor. For example, as represented in Equation 2, the subject vehicle path predicting unit 110 may be configured to calculate a curvature radius (e.g., a rotation radius) R, wherein $v_x$ may represent a driving velocity of the subject vehicle and γ may represent a yaw rate (e.g., rotation angular velocity) of the subject vehicle. Further, the acceleration of subject vehicle may be included calculation of the curvature radius R. In other words, the subject vehicle path predicting unit 110 may be configured to calculate a path to a predetermined distance, or a distance obtained by converting a corresponding velocity and a predetermined time, among trajectories based on the calculated curvature radius R, which may be used as a driving trajectory of the subject vehicle. The yaw rate may be utilized for an emergency brake system (e.g., intelligent smart cruise control (SCC) system or an advanced emergency brake (AEB)).

$$R = \frac{v_x}{\gamma} \quad \text{Equation 2}$$

The situation awareness unit 120 may be configured to provide a warning, or the like to prevent an omni-directional (e.g., about 360 degree) collision. Further, the target path predicting unit 121 may be executed by the controller to predict the driving trajectory of the target vehicle by estimating the velocity, the acceleration, the yaw rate, and the like of the target vehicle using the driving information of the target vehicle. The target path predicting unit 121 may be configured to estimate the velocity, the acceleration, the yaw rate, and the like of the target vehicle by analyzing a driving path of the target vehicle based on the information obtained by the imaging device image and the radar sensor, and predict locations of the target vehicle during a predetermined period of time (e.g., about 3 seconds) by calculating a location (e.g., x-axis location (x), y-axis location (y)) of the target vehicle at a predetermined time unit (Δt) (e.g., about 0.01 second) while the velocity ($v_x$), the acceleration (a), and the yaw rate (γ) of the target vehicle as illustrated in Equation 3 may be substantially maintained.

$$x(k+1) = x(k) + v(k)\cos \psi(k)\Delta t$$

$$y(k+1) = y(k) + v(k)\sin \psi(k)\Delta t$$

$$v(k+1) = v_x(k) + a\Delta t$$

$$\psi(k+1) = \psi(k) + \gamma\Delta t \quad \text{Equation 3}$$

According to the present disclosure, a complex motion of the target vehicle may be predicted by subdividing the location of the target vehicle into the predetermined period of time to predict a collision. Further, a system that may be configured to calculate the tracking information (TTX) such as the predefined time-to-intersect and time-to-exit related information (e.g., TTI, TTE, TTAI, TTAE, TTC, and the like) of the target vehicle may be more easily designed.

The tracking information (TTX) calculating unit 122 may be configured to calculate time-to-intersect and time-to-exit related tracking information (TTX) of the target vehicle such as a time-to-intersect (TTI), a time-to-exit (TTE), a time-to-angular-intersect (TTAI), a time-to-angular-exit (TTAE), a time-to-collision (TTC), and the like, which may be predefined, using the driving trajectory of the target vehicle and the driving trajectory of the subject vehicle. In other words, the tracking information (TTX) calculating unit 122 may be configured to calculate the tracking information (TTX), which may be related to a time when the target vehicle intersects with or exits from the driving trajectory of the subject vehicle during the predetermined period of time (e.g., three seconds).

Figure 3:
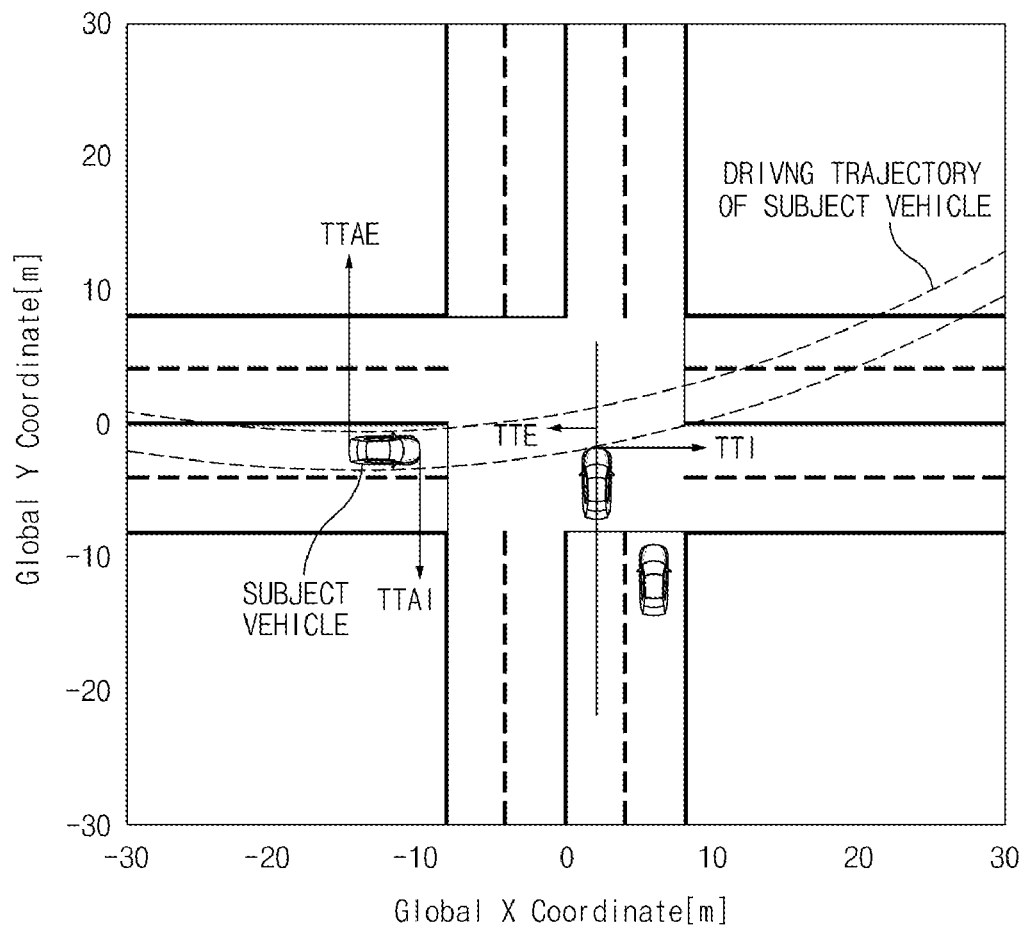
FIG. 3 is an exemplary diagram showing an example of time-to-intersect and time-to-exit related information (TTI, TTE, TTAI, TTAE) of a target vehicle according to an exemplary embodiment of the present disclosure.

The time-to-intersect (TTI) may be a time when a portion of the target vehicle intersects with a path of the driving trajectory of the subject vehicle, and FIG. 3 illustrates an exemplary embodiment of the TTI when a crossing vehicle (e.g., a target vehicle) begins to enter the path of the driving trajectory of the subject vehicle. The time-to-exit (TTE) may be a time when the target vehicle (e.g., from a front of a target vehicle to a rear of the target vehicle) exits from the path of the driving trajectory of the subject vehicle, and FIG. 3 illustrates an exemplary embodiment of the TTE when a crossing vehicle (e.g., a target vehicle) passes through and exits from the path of the driving trajectory of the subject vehicle.

The time-to-angular-intersect (TTAI) may be a time when a portion of the target vehicle intersects with a circular trajectory of the subject vehicle based on a substantially center point of the curvature radius R of the driving trajectory of the subject vehicle, and FIG. 3 illustrates an exemplary embodiment of the TTAI when a front vehicle, a crossing vehicle, an oncoming vehicle, a rear vehicle, and the like begin to enter the path of the circular trajectory of the subject vehicle at the same angle. The time-to-angular-exit (TTAE) may be a time when the entire target vehicle (e.g., the whole vehicle from the front end to the rear end) exits from the circular trajectory of the subject vehicle based on the center point of the curvature radius R of the driving trajectory of the subject vehicle, and FIG. 3 illustrates an exemplary embodiment of the TTAE when a front vehicle, a crossing vehicle, an oncoming vehicle, a rear vehicle, and the like pass through the location of the subject vehicle on the circular trajectory of the subject vehicle and exit from the location of the subject vehicle at about the same angle.

The time-to-collision (TTC) may be a timing-to-collision when a collision with a front vehicle, a crossing vehicle, an oncoming vehicle, a rear vehicle, and the like is expected. For example, the time-to-collision (TTC) may be when condition 2 or condition 3 occurs and condition 1 is satisfied.

Condition 1

(TTI<TTAE) and (TTAI<TTE)

Condition 2

Any one point (e.g., a vertex) of the target vehicle, at which the intersection or the angular-intersection occurs, is the same location as the portion of the subject vehicle.

$(L|\cos \theta \sin \theta|) - (|G \sin \theta| + |\alpha \cos \theta|) < 0$  Condition 3

Figure 4:
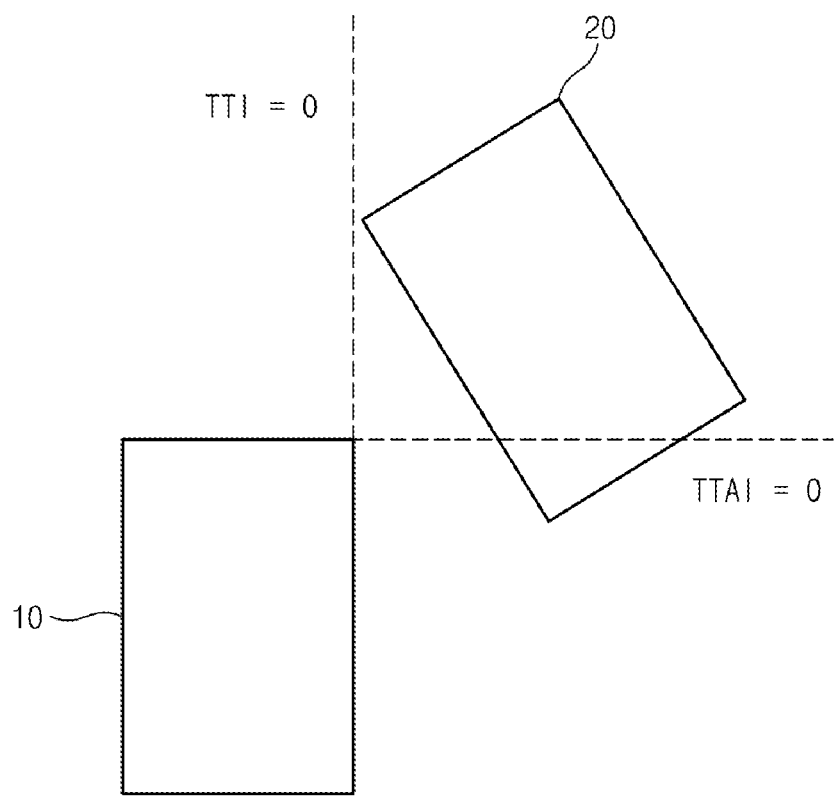
FIG. 4 is an exemplary diagram showing an example of a non-collision situation between a subject vehicle and the target vehicle according to an exemplary embodiment of the present disclosure.

When TTI is less than TTAE as described in condition 1, the intersection may occur before the target vehicle angularly-exits from the circular driving trajectory of the subject vehicle. At the same time, when TTAI is less than TTE (e.g., when the angular-intersect occurs before the target vehicle exits from the driving trajectory of the subject vehicle), a collision may be expected. However, when condition 1 is satisfied, the subject vehicle and the target vehicle may be prevented from colliding. For example, FIG. 4 shows TTI is less than TTAE since TTI may equal 0 and TTAI is less than TTE since TTAI may be greater than 0, but the collision may be prevented. Therefore, when condition 1 is satisfied, the collision may be expected when any point (e.g., a vertex) of the target vehicle is in the same location as the portion of the subject vehicle.

Figure 5:
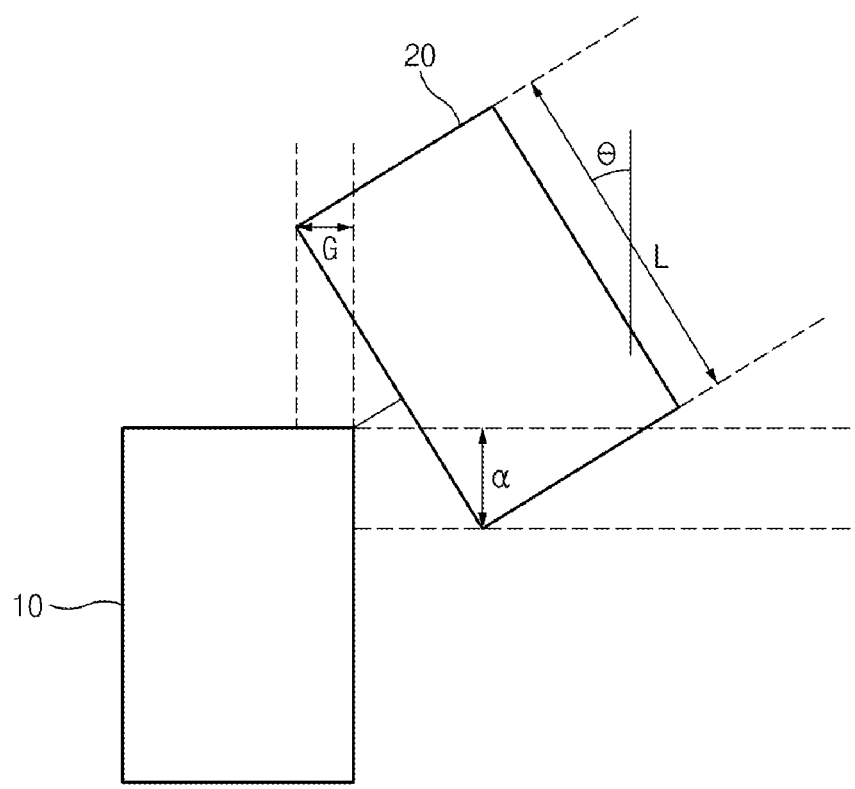
FIG. 5 is an exemplary diagram showing an example of a collision situation between the subject vehicle and the target vehicle according to an exemplary embodiment of the present disclosure.

In addition, when the condition 1 is satisfied, as shown in FIG. 5, and condition 3 is satisfied, a collision may be expected. In condition 3, L may represent about the entire length from a front of the target vehicle to the rear of the target vehicle, G may represent a front intersecting length after the target vehicle angularly-intersects, α may represent a rear intersecting length in the driving path direction of the target vehicle, and θ may represent an angle between a driving direction of the subject vehicle and a driving direction of the target vehicle.

Further, when acceleration/deceleration, the tracking information (TTX) calculating unit 122 may be configured to calculate the TTI when the subject vehicle decelerates ($TTI_d$) and the TTE when the subject vehicle accelerates ($TTE_a$) to predict whether the collision will occur based on the acceleration/deceleration of the subject vehicle. In Equation 4, $TTI_{max}$ may represent a predetermined maximum value of the TTI, $TTE_{max}$ may represent a predetermined maximum value of the TTE, $a_{decel}$ may represent acceleration when the subject vehicle decelerates, $a_{accel}$ may represent acceleration when the subject vehicle accelerates, $v_t$ may represent a velocity when the subject vehicle starts to accelerate or decelerate, and $a_t$ may represent acceleration after starting the acceleration or deceleration of the subject vehicle.

The TTI when the subject vehicle decelerates ($TTI_d$) may increase relative to an original TTI based on a deceleration degree, and when the deceleration of the subject vehicle is greater than a predetermined value, the subject vehicle may stop before an intersection (e.g., the subject vehicle and a target vehicle collide) occurs, thereby creating a non-collision situation. Accordingly, the $TTI_d$ may be replaced with the predetermined maximum value ($TTI_{max}$) of the TTI as in Equation 4, and since the location prediction may be performed up to about 3 seconds, for example, the $TTI_{max}$ may be set to a value of about 3 seconds or greater.

The TTE the subject vehicle accelerates ($TTE_a$) may be decreased relative to an original TTE based on the acceleration, and when the exit from the path of the driving trajectory of the subject vehicle is not scheduled (e.g., when the acceleration of the subject vehicle is less than a predetermined value), the $TTE_a$ may be the maximum value ($TTE_{max}$).

$$TTI_d = \begin{cases} TTI_{max}, -\dfrac{v_t^2}{2(v_t TTI + a_t TTI^2)} - a_{decel} = > 0 \\ -\dfrac{v_t - \sqrt{v_t^2 + 2\dfrac{(v_t TTI + a_t TTI^2)}{a_{decel}}}}{a_{decel}}, \\ -\dfrac{v_t^2}{2(v_t TTI + a_t TTI^2)} - a_{decel} < 0 \end{cases} \quad \text{Equation 4}$$

$$TTE_a = \begin{cases} TTE_{max}, TTE = TTE_{max} \\ -\dfrac{v_t - \sqrt{v_t^2 + 2\dfrac{(v_t TTE + a_t TTE^2)}{a_{accel}}}}{a_{accel}}, TTE < TTE_{max} \end{cases}$$

In FIG. 2, the collision determining unit 123 may be configured to determine various collision types for a front vehicle, a crossing vehicle, an oncoming vehicle, a rear vehicle, and the like by predicting collision flags. The collision flags may be classified in advance based conditions that use the time-to-intersect and time-to-exit related tracking information (TTX) of the target vehicle.

FIG. 6 is an exemplary conditional table for predicting whether a collision between the subject vehicle and the target vehicle occurs based on the time-to-intersect and time-to-exit related tracking information (TTX). FIG. 6 is summarized in a way where the TTX may increase in a right direction, and may classify a case when the collision is detected or is imminent into 'Collision', a case when a collision may be avoided into 'Avoidable', a case when a target (e.g., target vehicle) is not present or a situation is not detected into 'Avoided', and the like. Even when condition 1, condition 2, or condition 3 are satisfied, whether the collision may occur may be more accurately determined based on the conditions such as the $TTI_d$, the $TTE_a$, and the like.

As illustrated in FIG. 6, when the TTI and the TTAI are substantially small or the TTE and the TTAE are substantially large, a collision probability may be increased, and the collision determining unit 123 may be configured to determine the collision flags as illustrated in FIG. 7 based on a time difference between the TTI and the TTAE and a time difference between the TTAI and the TTE. For example, 'Avoided' cases, when the target (e.g., the target vehicle) is not present or the situation is not detected, may correspond to collision flags 0 and 1 as shown in FIG. 7 based on the time difference between the TTI and the TTAE and the time difference between the TTAI and the TTE. In addition, 'Avoidable' cases, when the collision may be avoided as shown in FIG. 6, may correspond to collision flags 2 to 5 based on the time difference between the TTI and the TTAE and the time difference between the TTAI and the TTE.

Further, 'Collision' cases, when the collision is detected or is imminent (e.g., when the collision may occur within a predetermined period of time) may correspond to the collision flags 6 to 8. For the predictions as described above, a collision direction, and the like, which may be predicted by a location and a direction of the time-to-collision (TTC) with the target vehicle, may be referenced in addition to the TTC, the driving information of the subject vehicle (e.g., the velocity, the acceleration, and the like of the subject vehicle), the driving trajectory of the subject vehicle, and the driving trajectory of the target vehicle, which may be analyzed by the target path predicting unit 121, and the like may be referenced.

Figure 8:
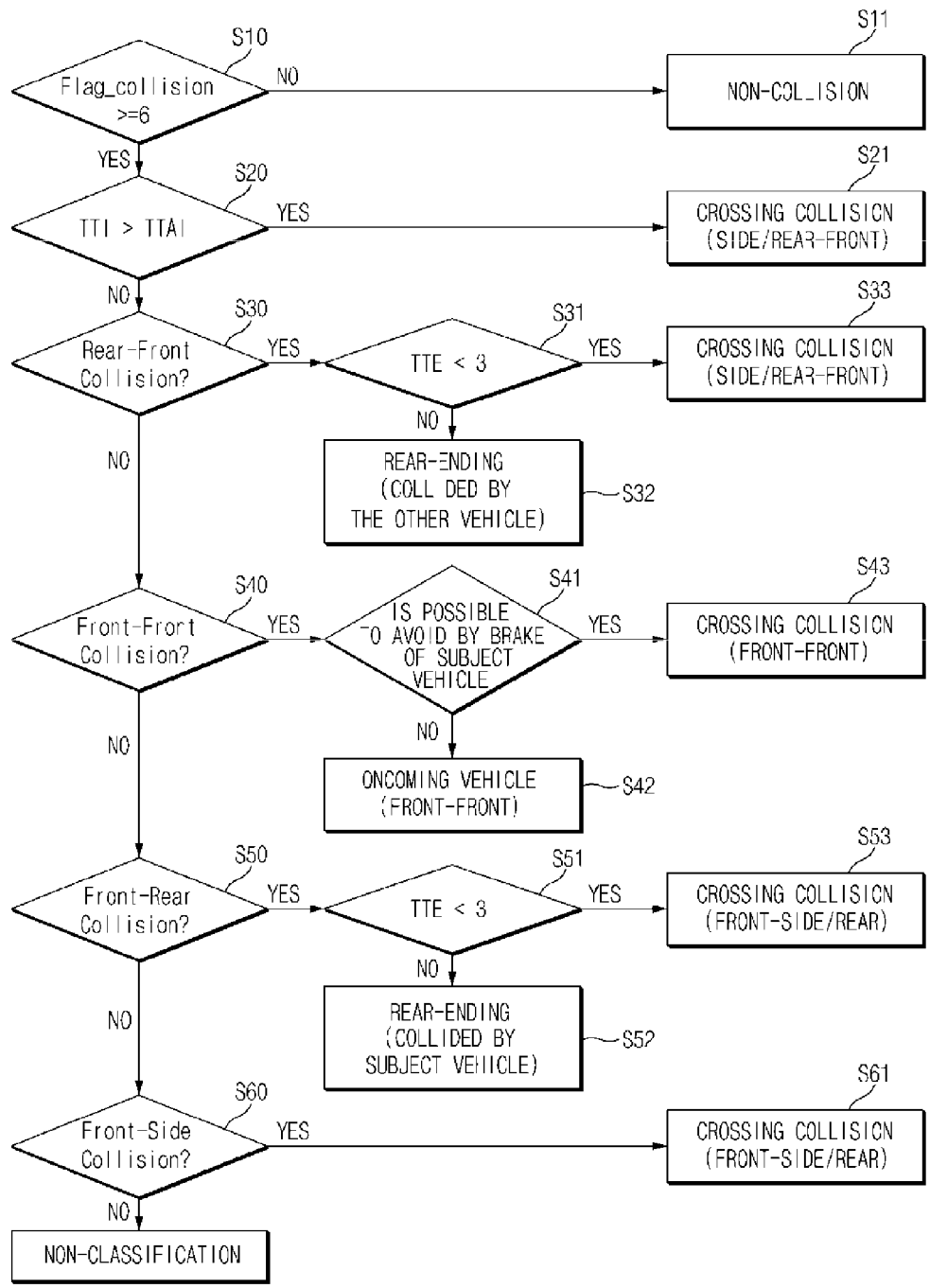
FIG. 8 is an exemplary flow chart for describing a collision type prediction by a collision determining unit according to an exemplary embodiment of the present disclosure.

FIG. 8 is an exemplary flow chart showing a collision type prediction by the collision determining unit according to an exemplary embodiment of the present disclosure. Referring to FIG. 8, the collision determining unit 123 may be configured to predict collision flags 0 to 5 (S11) as a non-collision (e.g., a collision type 0), determine various collision types for a front vehicle, a crossing vehicle, an oncoming vehicle, a rear vehicle, and predict a collision direction using a location and a direction of a collision timing with the predicted target vehicle for the collision flags 6 to 8. As illustrated in FIG. 9, the respective collision types may be determined based on whether the target vehicle exits from the path of the driving trajectory of the subject vehicle, the collision direction, or the like. Particularly, in FIG. 9, collision types 3 and 4 may have the same collision direction, but may be classified differently based on whether the other target vehicle exits from the driving trajectory path of the subject vehicle, one collision type may correspond to collision type 3, and another collision type may correspond to collision type 4.

Collision type 4 may be when the oncoming vehicle is expected to arrive at a current location of the subject vehicle, and collision avoidance is impossible by a longitudinal motion of the subject vehicle. Alternatively, collision type 3 may be the same front-front collision as the collision type 4, but may be when the subject vehicle may avoid the collision. For the predictions as described above, a collision direction, and the like, which may be predicted by a location and a direction of the time-to-collision (TTC) with the target vehicle, may be referenced. Further, the path of the driving trajectory of the target vehicle, which may be analyzed by the target path predicting unit 121, and the like may be referenced.

In FIG. 8, for collision flags 6 to 8, when TTI is less than TTAI (S20) may be when an angular-intersection is expected, and may be correspond to collision type 5 when a collision between a side rear (e.g., a rear side of a side a vehicle) of the subject vehicle and a front of the target vehicle may be expected (S21).

In addition, when TTI is less than TTAI, the collision with the other target vehicle of the front, the side, or the rear may be expected as follows. In other words, the crossing collisions (e.g., collision types 2, 3, and 5) with a crossing vehicle, the collision (e.g., collision type 4) with an oncoming vehicle, the rear collision (e.g., collision type 6) with a rear vehicle, a second rear collision (e.g., collision type 1), and the like may occur. When the collision type does not correspond to the above-mentioned types, a non-classification may be determined.

For example, when a collision (e.g., rear-front collision) between the rear or the side rear of the subject vehicle and the front of the other target vehicle is predicted (S30) in FIG. 8, when the TTE is a predetermined time (e.g., about 3 seconds) or greater (S31), the collision type may be predicted as the rear collision (the collision type 6) with the rear vehicle (S32). However, when the TTE is less than the predetermined time (e.g., about 3 seconds) (S31), which is when the angular-intersect is expected, the collision type may be predicted to be collision type 5 in which the collision between the side rear (rear of side) of the subject vehicle and the front of the crossing vehicle which is the other target vehicle, that is, the crossing collision (side rear-front) is expected (S33).

In addition, when a collision (e.g., front-front collision) between the front of the subject vehicle and the front of the other target vehicle is predicted (S40) and the collision may not be avoided (S41), the collision type may be predicted to correspond to a front-front collision (e.g., collision type 4) with the oncoming vehicle (S42). In particular, when the collision may be avoided (S41), the collision type may correspond to a front-front collision (e.g., collision type 3) (S43).

Further, when a collision (e.g., front-rear collision) between the front of the subject vehicle and the rear or the side rear of the target vehicle is predicted (S50) and the TTE is the predetermined period of time (e.g., about 3 seconds) or greater (S51), the collision type may be predicted as a rear collision (e.g., collision type 1) where the subject vehicle collides into the target vehicle (S52). However, when the TTE is less than the predetermined period of time (e.g., three seconds) (S51), the collision type may be predicted to correspond to the collision between the front of the subject vehicle and the side rear of the target vehicle (e.g., collision type 2) (S53).

Furthermore, when a collision between the side rear (e.g., a rear side of a side of a vehicle) of the subject vehicle and the side of the target vehicle is predicted (S60) and the TTI is less than the TTAI for collision flags 6 to 8, the collision type may be predicted to correspond to collision type 2 (S61).

As described above, the apparatus 100 for predicting a collision may more easily avoid collisions by expanding the prediction of collisions to the vehicles in an omni-direction (e.g., about 360 degrees) within an emergency brake system such as an advanced emergency brake (AEB) system. For example, the apparatus 100 may accurately perform a brake related control based on models of the collision vehicles or the collision types, or may perform an airbag related control (e.g., an unfolding of the airbag, a preparation of the unfolding, or the like) in advance.

In addition the apparatus 100 may be applied to an adaptive cruise control system (ACCS), a forward vehicle collision avoidance system (FVCAS), a side and backward vehicle collision avoidance system (SBVCAS), a lane departure warning system (LDWS), and the like. Further, according to the exemplary embodiments of the present disclosure, the method and the apparatus of predicting the collision emergency may avoid collision by expanding the prediction of a collision to vehicles in an omni-direction (e.g., about 360 degree).

Hereinabove, although the present disclosure is described by specific matters such as concrete components, and the like, exemplary embodiments, and drawings, they are provided only for assisting in the entire understanding of the present disclosure. Therefore, the present disclosure is not limited to the exemplary embodiments. Various modifications and changes may be made by those skilled in the art to which the present invention pertains without departing from the spirit and scope of the present disclosure. Therefore, the spirit of the present disclosure should not be limited to the above-described exemplary embodiments, and the following claims as well as all technical spirits modified equally or equivalently to the claims should be interpreted to fall within the scopes and spirits of the disclosure.

What is claimed is:

1. A method for predicting a collision with a target vehicle by a subject vehicle, comprising:
    calculating, by a controller, a driving trajectory of the subject vehicle based on a yaw rate using driving information of the subject vehicle;
    evaluating, by the controller, a driving trajectory of a target vehicle for a predetermined period of time using driving information of the target vehicle including information from an imaging device mounted on the subject vehicle for obtaining a front image and information from a plurality of radar sensors mounted on the subject vehicle; and
    predicting, by the controller, at least one collision type of a plurality of classified collision types by analyzing a collision possibility between the subject vehicle and the target vehicle based on the driving trajectory of the subject vehicle and the driving trajectory of the target vehicle, wherein
    the predicting of the at least one collision type includes:
        determining, by the controller, the at least one collision type based on a time difference between a time when a portion of the target vehicle intersects with a path of the driving trajectory of the subject vehicle (TTI) and a time when the target vehicle angularly-exits from a path of a circular trajectory of the subject vehicle based on a substantial center point of a curvature radius of the driving trajectory of the subject vehicle (TTAE) and a time difference between a time when the portion of the target vehicle angularly-intersects with the path of the circular trajectory of the subject vehicle based on the substantial center point of the curvature radius of the driving trajectory of the subject vehicle (TTAI) and a time when an entirety of the target vehicle exits from the path of the driving trajectory of the subject vehicle (TTE), and the evaluating of the driving trajectory of the target vehicle includes:
analyzing, by the controller, the driving information of the target vehicle as the driving trajectory of the target vehicle;
estimating, by the controller, a velocity, an acceleration, and a yaw rate of the target vehicle; and
calculating, by the controller, locations of the target vehicle at a predetermined time unit based on the velocity, the acceleration, and the yaw rate of the target vehicle.

2. The method according to claim 1, wherein the method further includes predicting, by the controller, a collision with the target vehicle in an omni-direction.

3. The method according to claim 1, wherein the target vehicle includes at least one selected from the group consisting of: a front vehicle, a crossing vehicle, an oncoming vehicle, and a rear vehicle.

4. The method according to claim 1, wherein the predicting of the at least one collision type further includes:
calculating, by the controller, tracking information (TTX) which is related to a time in which the target vehicle intersects with or exits from the driving trajectory of the subject vehicle during the predetermined period of time; and
determining, by the controller, collision flags based on conditions that use the TTX.

5. The method according to claim 4, wherein the TTX includes:
the TTI;
the TTE;
the TTAI;
the TTAE;
a time when the portion of the target vehicle intersects with the path of the driving trajectory of the subject vehicle ($TTI_d$); and
a time when the target vehicle exits from the path of the driving trajectory of the subject vehicle ($TTE_a$).

6. The method according to claim 4, wherein the plurality of classified collision types includes at least two selected from a group consisting of:
a non-collision,
a first rear collision when the subject vehicle collides into a rear side of the target vehicle,
a collision between a front of the subject vehicle and a side rear of the target vehicle,
a collision between the front of the subject vehicle and a front of the target vehicle,
a collision between the front of the subject vehicle and a front of the target vehicle,
a collision between a side rear of the subject vehicle and the front of the target vehicle, and
a second rear collision when the target vehicle collides into a rear side of the subject vehicle.

7. An apparatus for predicting a collision with a target vehicle by a subject vehicle, comprising:
a memory configured to store program instructions; and
a controller configured to execute the program instructions, the program instructions when executed configured to:
calculate a driving trajectory of the subject vehicle based on a yaw rate using driving information of the subject vehicle using a subject vehicle path predicting unit;
evaluate a driving trajectory of a target vehicle for a predetermined period of time using driving information of the target vehicle using a situation awareness unit, the driving information of the target vehicle including information from an imaging device mounted on the subject vehicle for obtaining a front image and information from a plurality of radar sensors mounted on the subject vehicle;
analyze the driving information of the target vehicle using a target path predicting unit;
estimate a velocity, an acceleration, and a yaw rate of the target vehicle using the target path predicting unit;
calculate locations of the target vehicle at a predetermined time unit based on the velocity, the acceleration, and the yaw rate of the target vehicle using the target patch predicting unit;
predict at least one collision type of a plurality of classified collision types by analyzing a collision possibility between the subject vehicle and the target vehicle using the situation awareness unit; and
determine the at least one collision type based on a time difference between a time when a portion of the target vehicle intersects with a path of the driving trajectory of the subject vehicle (TTI) and a time when the target vehicle angularly-exits from a path of a circular trajectory of the subject vehicle based on a substantial center point of a curvature radius of the driving trajectory of the subject vehicle (TTAE) and a time difference between a time when the portion of the target vehicle angularly-intersects with the path of the circular trajectory of the subject vehicle based on the substantial center point of the curvature radius of the driving trajectory of the subject vehicle (TTAI) and a time when an entirety of the target vehicle exits from the path of the driving trajectory of the subject vehicle (TTE) using a collision determining unit.

8. The apparatus according to claim 7, wherein the controller is further configured to predict the collision emergency with the target vehicle in an omni-direction.

9. The apparatus according to claim 7, wherein the target vehicle includes at least one selected from the group consisting of: a front vehicle, a crossing vehicle, an oncoming vehicle, or a rear vehicle.

10. The apparatus according to claim 7, wherein the controller is further configured to:
calculate tracking information (TTX), which is related to a time in which the target vehicle intersects with or exits from the driving trajectory of the subject vehicle during the predetermined period of time, using a tracking information calculating unit; and
determine collision flags based on conditions that use the TTX, using the collision determining unit.

11. The apparatus according to claim 10, wherein the TTX includes:
the TTI;
the TTE;
the TTAI;
the TTAE;
a time when the portion of the target vehicle intersects with the path of the driving trajectory of the subject vehicle ($TTI_d$); and
a time when the target vehicle exits from the path of the driving trajectory of the subject vehicle ($TTE_a$).

12. The apparatus according to claim 10, wherein the plurality of classified collision types include at least two selected from a group consisting of:
a non-collision,
a first rear collision when the subject vehicle collides into a rear side of the target vehicle,
a collision between a front of the subject vehicle and a side rear of the target vehicle, a collision between the front of the subject vehicle and a front of the target vehicle, a collision between the front of the subject vehicle and a front of the target vehicle, a collision between a side rear of the subject vehicle and the front of the target vehicle, and a second rear collision when the target vehicle collides into a rear side of the subject vehicle.

13. A non-transitory computer readable medium containing program instructions executed by a processor, the computer readable medium comprising:

program instructions that calculate a driving trajectory of the subject vehicle based on a yaw rate using driving information of the subject vehicle;

program instructions that evaluate a driving trajectory of a target vehicle for a predetermined period of time using driving information of the target vehicle including information from an imaging device mounted on the subject vehicle for obtaining a front image and information from a plurality of radar sensors mounted on the subject vehicle;

program instructions that analyze the driving information of the target vehicle as the driving trajectory of the target vehicle;

program instructions that estimate a velocity, an acceleration, and a yaw rate of the target vehicle;

program instructions that calculate locations of the target vehicle at a predetermined time unit based on the velocity, the acceleration, and the yaw rate of the target vehicle;

program instructions that predict at least one collision type of a plurality of classified collision types by analyzing a collision possibility between the subject vehicle and the target vehicle based on the driving trajectory of the subject vehicle and the driving trajectory of the target vehicle; and program instructions that determine the at least one collision type based on a time difference between a time when a portion of the target vehicle intersects with a path of the driving trajectory of the subject vehicle (TTI) and a time when the target vehicle angularly-exits from a path of a circular trajectory of the subject vehicle based on a substantial center point of a curvature radius of the driving trajectory of the subject vehicle (TTAE) and a time difference between a time when the portion of the target vehicle angularly-intersects with the path of the circular trajectory of the subject vehicle based on the substantial center point of the curvature radius of the driving trajectory of the subject vehicle (TTAI) and a time when an entirety of the target vehicle exits from the path of the driving trajectory of the subject vehicle (TTE).

14. The non-transitory computer readable medium of claim 13, further comprising:

program instructions that calculate tracking information (TTX), which is related to a time in which the target vehicle intersects with or exits from the driving trajectory of the subject vehicle during the predetermined period of time; and program instructions that determine collision flags based on conditions that use the TTX.

* * * * *